US00RE46898E

(19) United States
(12) Reissued Patent
Roland et al.

(10) Patent Number: US RE46,898 E
(45) Date of Reissued Patent: Jun. 19, 2018

(54) POLYMER COATINGS FOR ENHANCED AND FIELD-REPAIRABLE TRANSPARENT ARMOR

(71) Applicant: The United States of America, as represented by the Secretary of the Navy, Washington, DC (US)

(72) Inventors: Charles M. Roland, Waldorf, MD (US); Raymond M. Gamache, Indian Head, MD (US)

(73) Assignee: The United States of America, as represented by the Secretary of the Navy, Washington, DC (US)

(21) Appl. No.: 15/585,598

(22) Filed: May 3, 2017

Related U.S. Patent Documents

Reissue of:
(64) Patent No.: 9,285,191
Issued: Mar. 15, 2016
Appl. No.: 14/320,846
Filed: Jul. 1, 2014

(51) Int. Cl.
*F41H 5/04* (2006.01)
*F41H 7/04* (2006.01)

(52) U.S. Cl.
CPC ..... *F41H 7/04* (2013.01); *F41H 5/0407* (2013.01)

(58) Field of Classification Search
CPC ..... B32B 17/10; F41H 5/0407; F41H 7/04
See application file for complete search history.

(56) References Cited

U.S. PATENT DOCUMENTS 8,746,122 B1 6/2014 Roland et al. ..... F41H 5/04 89/36.02
2008/0000573 A1* 1/2008 Chu et al. ..... C04B 35/597 156/89.27
2009/0217813 A1* 9/2009 Carberry et al. . B32B 17/10036 89/36.02
2010/0143676 A1 6/2010 Hahn et al. ..... B32B 17/10018 428/212
2011/0203452 A1* 8/2011 Kucherov et al. ..... B32B 17/10119 89/36.02
2012/0189854 A1 7/2012 Cook et al. ..... B32B 25/08 428/423.7
2012/0297964 A1 11/2012 Carberry et al. ..... F41H 5/0407 89/36.02
2013/0305912 A1 11/2013 Weinhold ..... B32B 17/10045 89/36.02
2014/0127500 A1 5/2014 Carberry et al. . B32B 17/10366 428/345

OTHER PUBLICATIONS

Roland et al., "Elastomer-steel laminate armor" Composite Structures 92 (2010) 1059-1064.*

International Search Report and Written Opinion in PCT/US2015/025498.

Roland et al,. "Elastomer-steel laminate armor" Composite Structures 92 (2010) 1059-1064.

* cited by examiner

*Primary Examiner* — Sara Clarke

(74) *Attorney, Agent, or Firm* — US Naval Research Laboratory; Roy Roberts

(57) ABSTRACT

A coating of atactic polypropylene over a transparent armor substrate improves resistance to penetration while allowing convenient repair of minor abrasions and scratches.

9 Claims, 1 Drawing Sheet

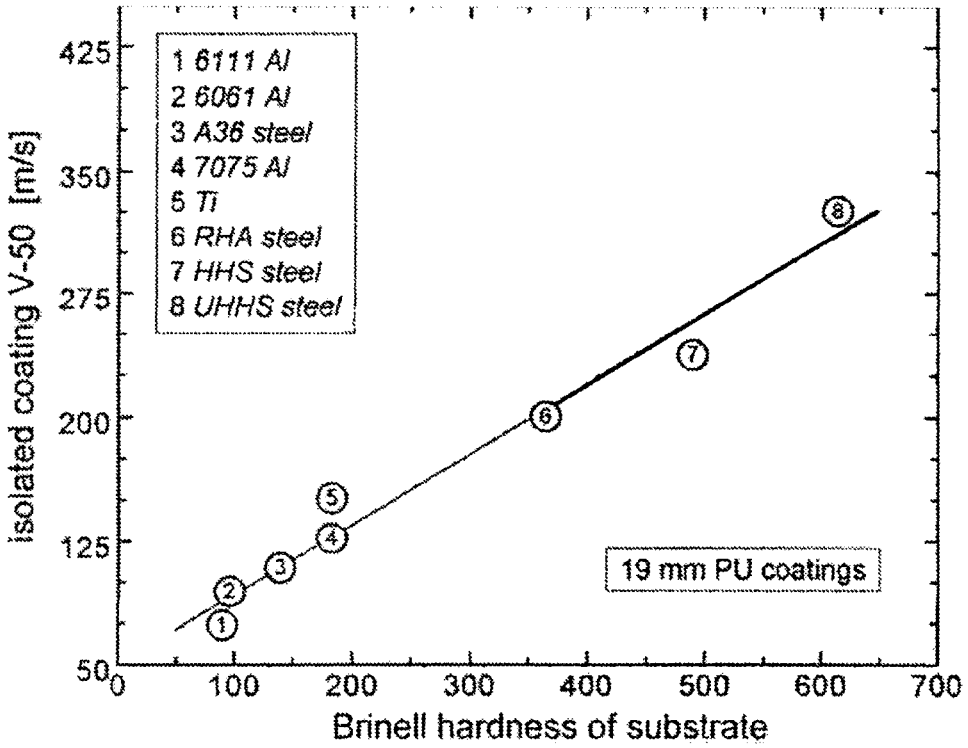
1 6111 Al
2 6061 Al
3 A36 steel
4 7075 Al
5 Ti
6 RHA steel
7 HHS steel
8 UHHS steel
19 mm PU coatings
isolated coating V-50 [m/s]
Brinell hardness of substrate
425
350
275
200
125
50
0
100
200
300
400
500
600
700

POLYMER COATINGS FOR ENHANCED AND FIELD-REPAIRABLE TRANSPARENT ARMOR

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

Drawbacks to conventional transparent armor include the need to use thicker panels to achieve desired levels of protection, thus incurring a weight penalty, and environmental erosion and scratching of the surface, which reduces transparency. A need exists to mitigate these problems.

BRIEF SUMMARY

In a first embodiment, an armor system includes a hard, transparent armor substrate, and a transparent coating of atactic polypropylene bonded to the armor substrate.

In another embodiment, a vehicle incorporates the armor system of the first embodiment, with the transparent coating configured to face an exterior surface of the vehicle, the armor system configured as a window, windscreen, or viewing port of said vehicle.

A further embodiment involves treating the armor system of the first embodiment by heating and smoothing the transparent coating, thereby improving optical clarity thereof.

BRIEF DESCRIPTION OF THE DRAWING

FIG. 1 shows the increase in velocity required to penetrate armor (V-50) due to the presence of a 19 mm polyurea coating.

DETAILED DESCRIPTION

Definitions

Before describing the present invention in detail, it is to be understood that the terminology used in the specification is for the purpose of describing particular embodiments, and is not necessarily intended to be limiting. Although many methods, structures and materials similar, modified, or equivalent to those described herein can be used in the practice of the present invention without undue experimentation, the preferred methods, structures and materials are described herein. In describing and claiming the present invention, the following terminology will be used in accordance with the definitions set out below.

As used in this specification and the appended claims, the singular forms "a", "an," and "the" do not preclude plural referents, unless the content clearly dictates otherwise.

As used herein, the term "and/or" includes any and all combinations of one or more of the associated listed items.

As used herein, the term "about" when used in conjunction with a stated numerical value or range denotes somewhat more or somewhat less than the stated value or range, to within a range of ±10% of that stated.

As used herein, the term "armor substrate" refers to new and conventional forms of transparent armor including, without limitation, laminates of soda-lime or borosilicate glass with polycarbonate as well as transparent ceramic armor including aluminum oxynitride ("Alon"), spinel (including nanocrystalline spinel), and the like, and combinations thereof.

*As used herein, "atactic polymer" refers to a polymer composed of atactic macromolecules, which are regular macromolecules in which the configurational (base) units are not all identical.*

Description

Elastomeric coatings were found to substantially increase the ballistic limit of underlying steel armor substrates when applied to the outside surface (that is, the "strike-face") with a composite array of elastomer-steel panels enjoying increases armor penetration resistance, as reported in Roland et al., "Elastomer-steel laminate armor" Composite Structures 92 (2010) 1059-1064, incorporated herein by reference.

Various coatings including polyurea and butyl rubber have shown to function well in this application, and the coating itself may include a combination of materials.

FIG. 1 shows the increase in average velocity required to penetrate armor (V-50) due to the presence of a 19 mm polyurea coating. The coating contribution to penetration resistance systematically increases with increasing substrate hardness. On steel substrates, mass efficiencies exceeding a factor of two have been achieved.

With regard to conventional transparent armor, thicker panels are required to achieve higher ballistic performance, with a concomitant weight penalty which is especially undesirably in the case of vehicles, adversely impacting performance, fuel economy, and payload, while the bulkier panels impinge on interior space. Furthermore, conventional transparent armor can be prone to environmental abrasion or scratching, reducing transparency and requiring costly and time-consuming repair.

This armor system may be applied to vehicles including manned or unmanned vehicles suitable for travel on the ground, or in the air, on the surface of water or underwater, and combinations thereof. It may be used in windows, windscreens, viewing ports, and the like.

As described herein, a transparent armor system includes a polymer coating applied to a transparent armor substrate. The density by area of this transparent armor system can be less than that of conventional armor systems while providing equal or greater protection.

The protective function of the coating is believed to arise from an impact-induced phase transition with consequent large energy absorption, so that the substrate should be stiff enough to allow rapid compression of the coating. Atactic polypropylene with a glass transition temperature of about −20° C. functions as a suitable coating due to this phenomenon, while providing the desired transparency.

Armor Substrate

The armor substrate is preferably transparent and with sufficient rigidity and hardness to support the coating while also itself resisting penetration. Most preferably, the armor substrate has a hardness of at least 150, 200, 300, 400, 500 , or more, as measured using the Brinell method with a tungsten ball of 10 mm diameter and 3,000 kg force.

The armor substrate may be one or more new or conventional forms of transparent armor including, without limitation, laminates of soda-lime or borosilicate glass with polycarbonate and transparent ceramic armor including aluminum oxynitride ("Alon"), spinel (including nanocrystalline spinel), and the like, and combinations thereof. Nanocrystalline ceramic material that might be suitable for use as an armor substrate is described in commonly-owned U.S. Provisional Patent Application No. 61/907,440 filed on Nov. 22, 2013, incorporated herein by reference.

Traditional bullet-resistant glass is available with coatings under the trade names MARGARD and MAKROLON intended to improve scratch resistance. The present armor system may be used with any such forms of coated transparent substrates, termed secondary coatings to distinguish them from the atactic polypropylene coating of the invention. It is believed that hard coatings may increase the effective hardness of the glass, thus improving performance of the system as seen in FIG. 1. The polypropylene coating senses the hardness of the substrate of length-scales commensurate with the wavelength of the longitudinal pressure wave—this may guide the design of the thickness of a secondary coating.

Coating

The polymeric coating is preferably atactic polypropylene. It was found that isotactic polypropylene would crystallize and fail to provide the desired ballistic performance. A suitable molecular weight may be from about 40 to about 80 kilograms/mol for an atactic polypropylene polymer. In preparing the polymer, it should be cooled quickly to avoid formation of crystals large enough to scatter visible light.

The coating thickness may range, for example, from about 0.25 cm to about 2.0 cm.

The coating may be bonded to the armor substrate using various techniques. It may be in direct contact with the armor substrate or bonded thereto via an intermediate adhesive. It may be cast into place on the armor substrate. Mechanical bonding may be used, for example using a frame, clamps, bolts, or other fasteners. A combination of bonding techniques may be used.

An advantage of this transparent polymeric coating is its reversible solidification (as opposed to solidification via a practically irreversible chemical change in other polymers). Thus, abrasions and scratches may be removed by heating, optionally while contacting the surface of the polymer with a smooth surface. It was found that a temperature of about 100° C. was sufficient to repair atactic polypropylene. Such repairs could easily be made in the field.

Concluding Remarks

All documents mentioned herein are hereby incorporated by reference for the purpose of disclosing and describing the particular materials and methodologies for which the document was cited.

Although the present invention has been described in connection with preferred embodiments thereof, it will be appreciated by those skilled in the art that additions, deletions, modifications, and substitutions not specifically described may be made without departing from the spirit and scope of the invention. Terminology used herein should not be construed as being "means-plus-function" language unless the term "means" is expressly used in association therewith.

What is claimed is:

1. A transparent armor system comprising:

a hard, transparent armor substrate, and a transparent coating consisting of atactic polypropylene having a thickness of from about 0.25 cm to about 2.0 cm bonded to the armor substrate as an outside surface.

2. The transparent armor system of claim 1, wherein said armor substrate is selected from the group consisting of (1) laminates of soda-lime or borosilicate glass with polycarbonate and (2) transparent ceramic armor.

3. The transparent armor system of claim 1, wherein said armor substrate is aluminum oxynitride or spinel.

4. The transparent armor system of claim 1, wherein said armor substrate has a hardness of at least 150 Brinell as measured with a tungsten ball of 10 mm diameter and 3,000 kg force.

5. The transparent armor system of claim 1, further comprising a secondary coating with a hardness greater than that of the armor substrate, disposed between the armor substrate and the transparent coating of atactic polypropylene.

6. The transparent armor system of claim 1, wherein said transparent coating is bonded to said armor substrate mechanically and/or with an adhesive.

7. A vehicle comprising a transparent armor comprising:

a hard, transparent armor substrate, and a transparent coating consisting of atactic polypropylene bonded to the armor substrate having a thickness from about 0.25 cm to about 2.0 cm, configured to face an exterior surface of said vehicle as an outside surface, wherein said transparent armor system is configured as a window, windscreen, or viewing port of said vehicle.

8. A method of treating a transparent armor system, the method comprising:

(a) providing an armor system comprising:

a hard, transparent armor substrate, and a transparent coating consisting of atactic polypropylene having a thickness from about 0.25 cm to about 2.0 cm bonded to the armor substrate as an outside surface; and (b) heating and smoothing the transparent coating, thereby improving optical clarity thereof.

9. The method of claim 8, wherein said heating and smoothing comprises contacting with said transparent coating with a smooth surface.

* * * * *